Patented Jan. 26, 1943

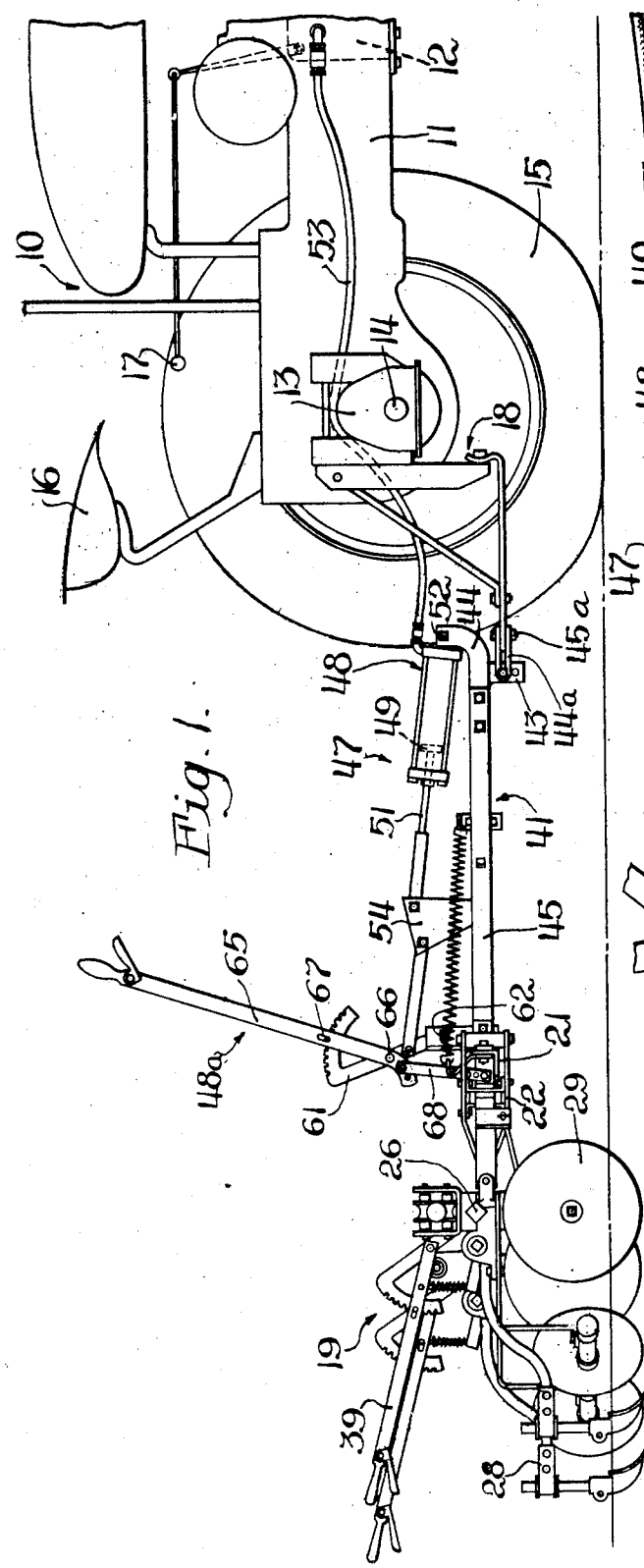
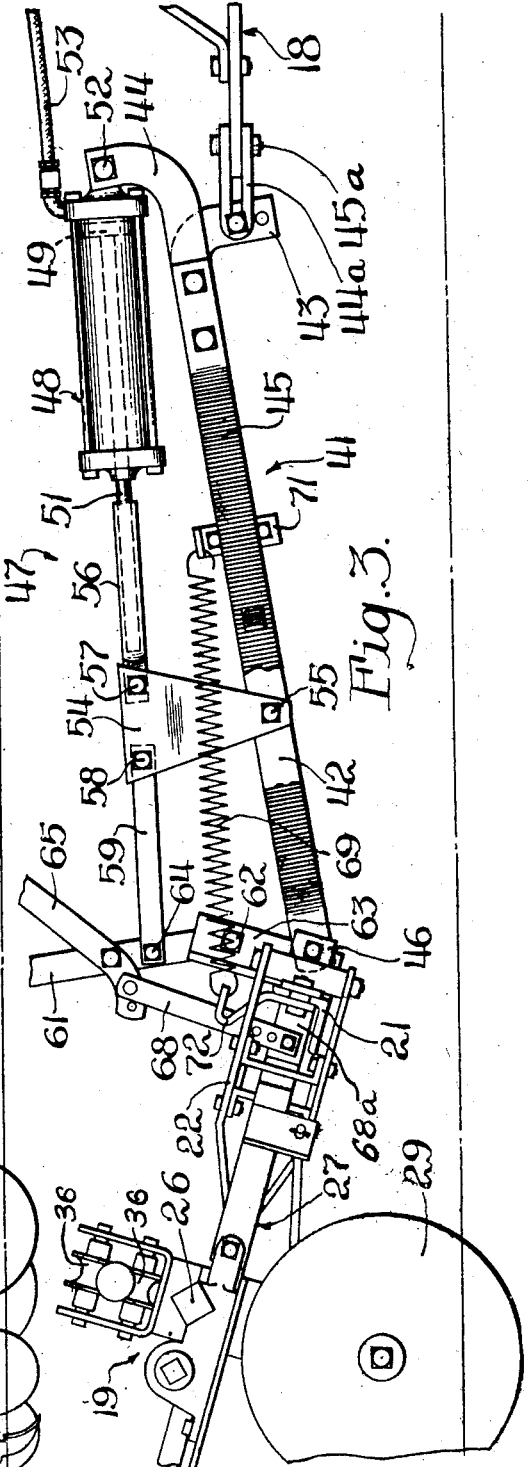

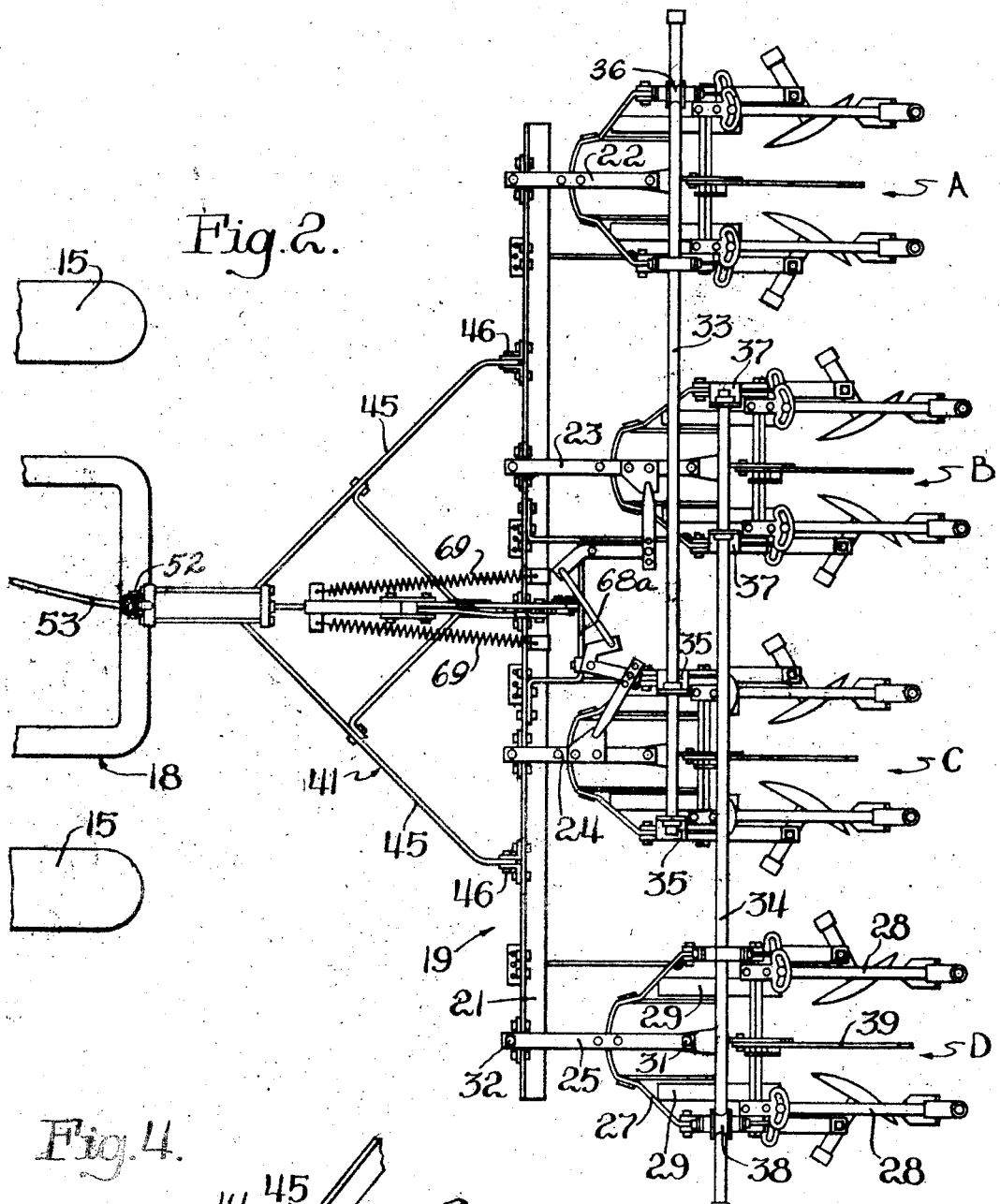

2,309,203

UNITED STATES PATENT OFFICE 2,309,203

LIFT DEVICE FOR IMPLEMENTS

James Morkoski, Canton, Ill., assignor to International Harvester Company, a corporation of New Jersey Application February 1, 1941, Serial No. 376,960

6 Claims. (Cl. 97—50)

This invention relates to a novel power mechanism for adjusting an implement that is trailingly connected to a tractor. In a more specific sense, the invention relates to a fluid-power means for moving the earth-working tools of an implement in one direction, and to a separate means for moving the earth-working tools in another direction, upon release of the fluid-power means.

It is desirable when connecting a trail-behind implement to a tractor, pivotally to connect the implement so that it may move laterally and vertically about its pivotal connection. It is also desirable that the power mechanism for adjusting the earth-working tools be carried by the implement so that it can move about the pivotal connection of the implement. It is also desirable to have a manually adjustable means associated with the power mechanism so that the depth of operation of the earth-working tools can be readily changed.

It is an important object of this invention to provide a novel power mechanism for adjusting an implement that is trailingly connected to a tractor.

Another important object of this invention is to provide a novel power mechanism for adjusting a wheel supported implement that is trailingly connected to a tractor.

Another object of this invention is to provide a fluid cylinder device for moving the earth-working tools of an implement that is trailingly connected to a tractor into the ground, and a spring means for moving said earth-working tools to a raised position upon release of the fluid in the fluid cylinder device.

Another object of this invention is to provide means for connecting a trail-behind implement to a tractor which also serves as a supporting means for a fluid cylinder device.

Other objects and advantages will appear in the following description of a preferred embodiment of the invention, as illustrated in the accompanying drawings, in which:

Figure 1 is a side view of a wheel supported implement pivotally connected to a tractor by a draft member on which is carried the novel power device which adjusts the implement;

Figure 2 is a plan view of the structure shown in Figure 1;

Figure 3 is an enlarged side view of the structure shown in Figure 1, and shows the implement in a raised position; and, Figure 4 is a perspective view of the front end of the draft member.

Referring to Figures 1 and 2 of the drawings there is shown a tractor 10, which has a body portion 11 in which a hydraulic pump 12 is mounted and adapted to be driven by the motor of the tractor. At the rear of the body portion 11 extend axle housings 13 from which extend axles 14 on which are secured drive wheels 15. The usual operator's station 16 is provided at the rear of the tractor body 11. The hydraulic pump 12 is controlled by a lever 17 which extends near to the operator's station 16. On the axle housings 13 is secured the usual draw-bar structure 18 to which implements may be connected.

The implement 19 that is shown connected to the draw-bar 18 is a lister cultivator of the type shown in the W. S. Graham Patent 2,102,262 of December 14, 1937. Since this type of implement is well known to those skilled in the art only the pertinent parts of the implement will be here described.

The implement 19 comprises a transverse member 21 to which are pivotally connected rearwardly extending draft bars 22, 23, 24, and 25 on which are pivotally connected cultivator units A, B, C, and D respectively. Each of the cultivator units are practically identical in construction so only one unit will be described in detail.

Each cultivator unit comprises a transverse member 26 to which is bolted a frame 27 on which are secured earth-working tools 28. The transverse member 26 is carried on a pair of furrow guide wheels 29.

As shown in Figure 2, the cultivating unit may pivot about the pivot pin 31 which connects the transverse member 26 to one of the rearwardly extending draft bars 22, 23, 24, or 25. The forward ends of the draft bars are pivotally connected to the transverse member 21 by a bolt 32. By this particular construction it will be seen that as the machine travels along the row, the cultivating unit swings laterally to the right or to the left and adapts itself to the row. The respective cultivator units A, B, C, and D are held against vertical movement by means of a transverse pipe 33 which is associated with the cultivating units A and C, and a similar transverse pipe 34 which is associated with the cultivating units B and D.

As shown in Figure 2, the transverse pipe 33 is secured at one end to the cultivating units C by a pair of brackets 35. The transverse pipe 33 extends outwardly across the cultivating unit A, and is adapted to cooperate with a pair of rollers 36 carried by the cultivating unit A. In a like manner, the transverse pipe 34 is secured at one end to the cultivating unit B by a pair of brackets 37. The transverse pipe 34 extends outwardly across the cultivating unit D, and is adapted to cooperate with a pair of rollers 38 carried by the cultivating unit D. By this particular construction the cultivating units A and C may move laterally independently of each other. However, in the event the cultivating unit A or unit C tends to move too far upwardly or downwardly, the transverse pipe 33 tends to support the unit A or the unit C from the unit that is not moving. In other words, assuming that unit C rides the ground and the unit A comes to a hole in the ground, the unit A will be suspended in part by the outer end of the transverse pipe 33. In a like manner, the cultivating units B and D are supported by one another against excessive vertical movement. It will also be appreciated that the outer cultivating units A and D would likewise respectively support the inner cultivating units C and B, in the event either set tends to move too far upwardly or downwardly. On each of the frames 27 of the cultivating units A, B, C, and D is mounted a lever 39 which is operatively connected to the earth-working tools 28 in such a manner that the operating depth thereof may be readily changed. The implement 19 is adapted to be connected to the tractor by a hitch device 41.

The hitch device 41 comprises a longitudinally extending member 42, the forward end of which is provided with a downwardly turned portion 43 having a plurality of openings provided therein, and the rear end of the member 42 is pivotally connected to the transverse member 21. At the forward end of the longitudinal draft member 42, as shown in Figure 4, is bolted a pair of bars 44 which extend forwardly into an arcuate portion in which alined openings are provided. Adjacent the bars 44 are secured laterally and rearwardly extending bars 45. The rear ends of the bars 45 are pivotally connected to a pair of brackets 46 provided on the transverse member 21. Referring now to Figure 1, it is to be noted that the downwardly extending portion 43 of the longitudinal bar 42 is pivotally connected by a clevis 44a to the tractor draw-bar 18 of the tractor 10. The clevis 44a is pivotally connected to the draw-bar 18 by a bolt 45a. Thus, it is to be seen that the implement 19 is free to move laterally to the right or to the left or upwardly and downwardly with respect to its pivotal connection to the tractor draw-bar 18. The implement 19 is adapted to be adjusted by a power device 47, and a manually controlled means 48a which is carried by the draft frame 41 and the transverse member 21.

In the present instance the power device 47 consists of a cylinder 48 in which is slidably mounted a piston 49 from which extends a rod 51. The cylinder 48 is pivotally connected to the arcuate portion of the bars 44 by a bolt 52 which is inserted in the alined openings provided in the bars 44 and an opening provided in the end of the cylinder 48. As shown in Figure 2, the pivot bolt 52 is substantially within the vertical axis of the pivot bolt 45a. In this way, as the implement 19 and the draft frame 41 move about the pivot bolt 45a, the cylinder 48 also moves about the pivot bolt 45a. A conduit 53 connects the hydraulic pump 12 with the cylinder 48 and upon operation of the lever 17, fluid is pumped from the hydraulic pump 12 through the conduit 53 into the cylinder 48 and moves the piston 49 which is slidably mounted therein. The rod 51 of the piston 49 is operatively associated with the manually adjustable means 48a.

On the longitudinally disposed bar 42 is pivotally mounted a pair of plate members 54 which are adapted to move fore and aft about their pivot bolt 55. The forward portion of the plate members 54 has a tubular sleeve 56 pivotally connected between the plates 54 by a bolt 57. The tubular sleeve 56 is adapted to receive the rod 51 of the piston 49. At the rear of the plates 54 is pivotally connected, by a bolt 58, a link 59. The rear portion of the link 59 is in turn connected to the manually adjustable means 48a which comprises a sector 61 which is pivotally mounted by a bolt 62 to a bracket 63 rigidly carried by the transverse member 21. The link 59 is connected to the sector 61 by a bolt 64. On the sector 61 is pivotally mounted a lever 65 by means of a bolt 66. The usual hand controlled latch 67 is provided on the lever 65 and is adapted to cooperate with detents provided in the sector 61. The end of the lever 65 has a link 68 pivotally connected thereto and to a bracket 68a secured to the rear of the transverse member 21. As shown in Figure 1, adjustment of the hand lever 65 moves the sleeve 56 fore and aft over the sector 61, the link 59, and the plates 54. The fore and aft movement of the sleeve 56 in turn effects the stroke of the piston 49 and the rod 51. For example, when the lever 17 is operated, fluid is pumped by the hydraulic pump 12 into the conduit 53 and to the cylinder 48, which moves the piston 49 and the rod 51 against the end of the sleeve 56, which in turn moves the plates 54 rearwardly about the pivot bolt 55, which in turn moves the link 59 rearwardly against the sector 61. The lever 17 is then moved to a neutral position and the fluid is held in the cylinder 48. The movement of the piston 49 in this particular case forces the earth-working tools 28 of the implement 19 into the ground until the draft member 41 is substantially in the same horizontal plane as the frame of the implement 19. In other words, the earth-working tools are moved downwardly about their supporting wheels 29. It will also be apparent that, when the fluid in the cylinder 48 is released therefrom by operating the lever 17, the implement will buckle downwardly at the pivotal connection of the draft member 41 to the front of the transverse member 21, as shown in Figure 3. In order that the pivotal connection of the draft frame 41 to the transverse member 21 will positively more downwardly when the fluid is released from the cylinder 48, a pair of springs 69 are connected to a bracket 71 provided on the longitudinal bar 42, and to an upwardly extending bracket 72 carried by the transverse member 21. The pair of springs 69, as shown in Figures 1 and 3, are pivotally connected to the draft member 41 and the transverse member 21 at a point above the pivotal connection of the draft member 41 to the transverse member 21. In this manner, upon release of the fluid in the cylinder 48, the spring 69 moves the earth-working tools 28 out of the ground and forces the transverse member downwardly about the supporting wheels 29 which are provided for each of the cultivating units A, B, C, and D. By this particular construction, a power device is provided on the draft frame which forces the earth-working tools of the implement into the ground, and upon rendering the power device inoperative, an operating means is provided between the draft frame and the frame of the implement for moving the earth-working tools into a transport position.

From the foregoing description, it should be apparent that a novel power device has been provided for adjusting an implement that is trailingly connected to a tractor. The power device is carried by the frame which is pivotally connected to the implement and to the tractor. The implement is free to move laterally to the right or to the left or upwardly and downwardly about the pivotal connection of the implement to the tractor. The power device is carried by the frame in such a manner that it too may move about the pivotal connection of the implement to the tractor. In this way the conduit 53 is never placed under tension by the movement of the implement and consequently a much shorter conduit can be used. The power device operates against a manually adjustable means which regulates the amount of movement of the power device. In other words, the operating depth of the earth-working tools may be set by the manually adjustable means, and the power device will move the earth-working tools to the position at which the manually adjustable means is set. The power device when operating forces the earth-working tools of the implement into the ground, and when the power device is rendered inoperative, a separate means is provided between the draft frame and the implement frame for automatically moving the earth-working tools to a raised position.

The novel structure just described provides a simple, strong, and efficient power mechanism for adjusting an implement that is trailingly connected to a tractor. It is to be understood that various modifications in the preferred structure disclosed may be made without departing from the scope of the invention as defined in the following claims.

What is claimed is:

1. In combination, a tractor having a hydraulic pump, a wheel-supported frame having earth-working tools extending to the rear of the axis of its wheels, a draft member pivotally connected to the tractor and to the wheel-supported frame forwardly of its wheels, a member pivotally mounted on the draft member, a manually adjustable lever pivotally mounted on said frame, link means connecting said lever and the member, a fluid cylinder device carried by the draft member, conduit means connecting the hydraulic pump and the fluid cylinder device, a piston slidably mounted within the fluid cylinder device, a rod secured to the piston and extending from the cylinder device, and slide and guide means connecting said rod with said member.

2. In combination, a tractor having a hydraulic pump, a wheel-supported frame having earth-working tools extending to the rear of the axis of its wheels, a draft member pivotally connected to the tractor and to the wheel-supported frame forwardly of its wheels, a member pivotally mounted on the draft member, a manually adjustable lever pivotally mounted on said frame, link means connecting said lever and the member, a fluid cylinder device pivotally connected to the draft member, conduit means connecting the hydraulic pump and the fluid cylinder device, a piston slidably mounted within the fluid cylinder device, a rod secured to the piston and extending from the cylinder device, slide and guide means connecting said rod with said member in such a manner that the movement of the piston will rock the frame and move the earth-working tools into the ground, and spring means connected to the draft member and the wheel-supported frame at points spaced from the pivotal connection of the draft member to the frame for moving the earth-working tools out of the ground upon release of the piston.

3. In combination, a tractor having a hydraulic pump, a frame having earth-working tools, a draft member pivotally connected to the tractor and to the frame, a member pivotally mounted on the draft member, a manually adjustable lever pivotally mounted on said frame, link means connecting said lever and the member, a fluid cylinder device pivotally connected to the draft member, conduit means connecting the hydraulic pump and the fluid cylinder device, a piston slidably mounted within the fluid cylinder device, a rod secured to the piston and extending from the cylinder device, slide and guide means connecting said rod with said member in such a manner that the movement of the piston will move the earth-working tools into the ground, and spring means connected to the draft member and the frame at points spaced from the pivotal connection of the draft member to the frame for moving the earth-working tools out of the ground upon release of the piston.

4. In combination, a tractor having a power plant and a draw element, a trail-behind implement having parts adapted to be adjusted and draft means for connecting the implement to the draw element of the tractor for pivotal movement from side to side with respect thereto, a fluid power-actuated device for adjusting the parts of the implement, hose means for connecting the device to the tractor power plant to receive power therefrom, and means carried on the implement draft frame and extending forwardly of the same to a point substantially in alinement with the point of pivotal connection of the same with the draw element, whereby any whipping of the hose connection is kept at a minimum.

5. In combination, a tractor having a power plant and a draw element, a trail-behind implement having parts adapted to be adjusted and draft means for connecting the implement to the draw element of the tractor for pivotal movement from side to side with respect thereto, said draft means including a draft frame and a clevis on the forward end thereof connected to the draw element, a fluid power-actuated device for adjusting the parts of the implement, hose means for connecting the fluid power-actuated device to the tractor power plant to receive fluid power therefrom, and means carried on the implement draft frame and extending forwardly of the same to a point substantially in alinement with the point of pivotal connection of the clevis with the draw element, whereby whipping of the hose connection is kept at a minimum.

6. In combination, a tractor having a fluid pressure supply plant, a trail-behind implement having a part adapted for adjustment and a draft frame for connecting the same to the tractor, a fluid cylinder, a piston slidably mounted within the fluid cylinder, a piston rod secured to the piston and extending from the cylinder device, conduit means for connecting the fluid cylinder device with the fluid pressure supply on the tractor, and means for removably connecting the fluid cylinder, piston, and piston rod to the draft frame and to the adjustable part to thereby effect adjustment of the same, said latter connecting means including a slide and guide means adapted to slidably receive the said piston rod.

JAMES MORKOSKI.